United States Patent
Deutsch et al.

(10) Patent No.: US 11,019,098 B2
(45) Date of Patent: May 25, 2021

(54) REPLAY PROTECTION FOR MEMORY BASED ON KEY REFRESH

(71) Applicant: Intel Corporation, Santa Clara, CA (US)

(72) Inventors: Sergej Deutsch, Hillsboro, OR (US); David Durham, Beaverton, OR (US); Karanvir Grewal, Hillsboro, OR (US); Rajat Agarwal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 16/023,941

(22) Filed: Jun. 29, 2018

(65) Prior Publication Data
US 2019/0044973 A1   Feb. 7, 2019

(51) Int. Cl.
*H04L 29/06* (2006.01)
*H04L 9/14* (2006.01)
*H04L 9/08* (2006.01)
*G09C 1/00* (2006.01)
*H04L 9/00* (2006.01)

(52) U.S. Cl.
CPC ............ *H04L 63/1466* (2013.01); *G09C 1/00* (2013.01); *H04L 9/002* (2013.01); *H04L 9/0861* (2013.01); *H04L 9/0891* (2013.01); *H04L 9/14* (2013.01); *H04L 63/0435* (2013.01); *H04L 63/123* (2013.01); *H04L 63/062* (2013.01); *H04L 2463/121* (2013.01)

(58) Field of Classification Search
CPC ... H04L 63/1466; H04L 63/123; H04L 9/002; H04L 63/0435; H04L 9/0891; H04L 9/14; H04L 9/0861; H04L 2463/121; H04L 63/062; G09C 1/00

USPC ........................................................ 713/171
See application file for complete search history.

(56) References Cited

U.S. PATENT DOCUMENTS 6,085,323 A * 7/2000 Shimizu ................ H04L 9/0822
380/277
8,423,758 B2 * 4/2013 Singhal ............... H04L 63/0236
713/150

(Continued)

FOREIGN PATENT DOCUMENTS

WO    2017112282 A1    6/2017

*Primary Examiner* — Abu S Sholeman
(74) *Attorney, Agent, or Firm* — Alliance IP, LLC

(57) ABSTRACT

The present disclosure is directed to systems and methods for providing protection against replay attacks on memory, by refreshing or updating encryption keys. The disclosed replay protected computing system may employ encryption refresh of memory so that unauthorized copies of data are usable for a limited amount of time (e.g., 500 milliseconds or less). The replay protected computing system initially encrypts protected data prior to storage in memory. After a predetermined time or after a number of memory accesses have occurred, the replay protected computing system decrypts the data with the existing key and re-encrypts data with a new key. Unauthorized copies of data (such as those made by an adversary system/program) are not refreshed with subsequent new keys. When an adversary program attempts to use the unauthorized copies of data, the unauthorized copies of data are decrypted with the incorrect keys, which renders the decrypted data unintelligible.

14 Claims, 7 Drawing Sheets

(56) References Cited

U.S. PATENT DOCUMENTS

| | | | |
|---|---|---|---|
| 8,434,142 B2 * | 4/2013 | Haddad | H04W 12/1008 |
| | | | 726/14 |
| 9,483,664 B2 * | 11/2016 | Chandra | G06F 21/79 |
| 9,774,445 B1 * | 9/2017 | Gandhasri | H04L 9/08 |
| 2005/0025091 A1 * | 2/2005 | Patel | H04L 9/083 |
| | | | 370/328 |
| 2009/0187771 A1 * | 7/2009 | McLellan, Jr. | H04L 9/0891 |
| | | | 713/193 |
| 2011/0113248 A1 * | 5/2011 | Kocher | H04L 9/0625 |
| | | | 713/168 |
| 2014/0325235 A1 * | 10/2014 | Thompson | G06F 21/6218 |
| | | | 713/189 |
| 2015/0082040 A1 * | 3/2015 | Anzai | H04L 9/0822 |
| | | | 713/171 |
| 2016/0344629 A1 * | 11/2016 | Gray | H04L 45/60 |
| 2016/0364343 A1 * | 12/2016 | Case | H04L 9/0637 |
| 2017/0185529 A1 | 6/2017 | Chhabra | |
| 2017/0285976 A1 | 10/2017 | Durham et al. | |
| 2018/0095902 A1 * | 4/2018 | Lemay | G06F 12/1466 |

\* cited by examiner

REPLAY PROTECTION FOR MEMORY BASED ON KEY REFRESH

TECHNICAL FIELD

The present disclosure relates to computing system security, in particular relates to protecting against memory replay attacks.

BACKGROUND

A replay attack (also known as playback attack) is a form of cybersecurity attack that uses valid user information to perform unauthorized operations. Replay attacks include man in the middle attacks and memory replay attacks. To perform a man in the middle attack, an adversary may intercept network data and re-transmit the data to pretend to be an authorized user to gain access to user information. To perform a memory replay attack, an adversary may deploy a program that reads memory locations to obtain, for example, authentication credentials (e.g., a username and password). The adversary's program then presents the authentication credentials to one or more other programs, to appear to the program as an authorized user. Even if the authentication credentials are encrypted using traditional techniques, the adversary may present the data in its encrypted form and successfully gain unauthorized access to programs or information. An adversary can also replay an old value of a variable in a victim system to divert the execution flow in order to get unauthorized access to confidential data or even gain control over the entire system. Although adversaries may use a program to obtain copies of memory to perform replay attacks, adversaries may also perform replay attacks by physically connecting to a victim system to copy and replay data.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

DETAILED DESCRIPTION

Figure 1:
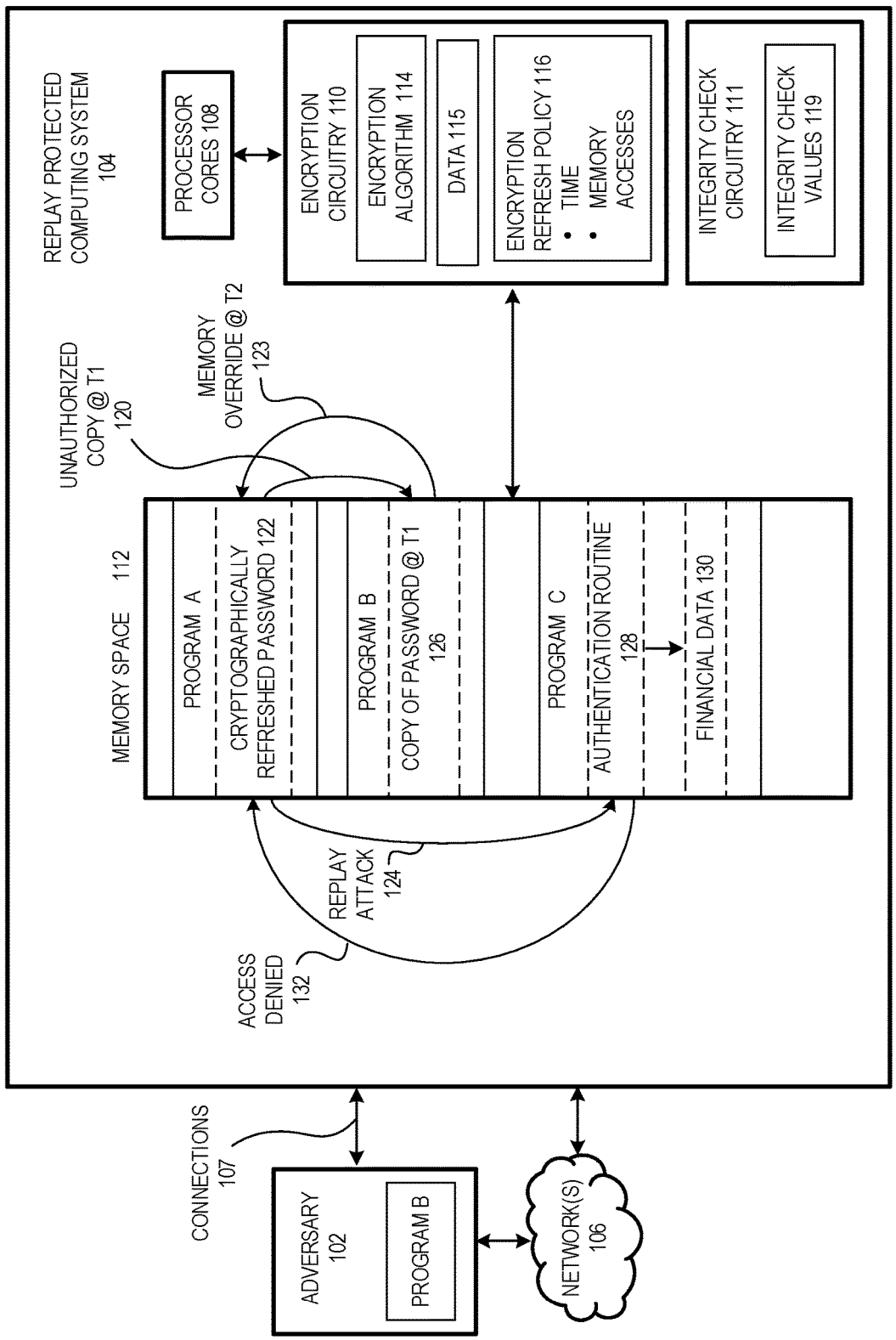
FIG. 1 is a block diagram of a computing environment that includes a replay protected computing system, in accordance with at least one embodiment described herein.

Disclosed are systems and methods that provide protection against replay attacks on memory, by refreshing or updating encryption keys. A memory replay attack is performed by taking a snapshot of a portion of memory (e.g., main memory) at one point of time and override this memory location with the captured (old) content at a later point of time after a program changed the memory content. Even if memory data is encrypted and integrity protected, replay of old content is still possible. Replay attacks may be used to obtain access to financial data, personally identifiable information (PII), or other secret or valuable information. Replay attacks may also be used to redirect operations of a program, disable security (e.g., disable indication of the existence of malware), perform unauthorized financial transactions, take over control of a computing system, or perform other operations that are authorized by or based on a particular set of data values.

The disclosed replay protected computing system may employ at least three techniques for reducing the likelihood of successful replay attacks. The replay protected computing system may periodically refresh encryption of encrypted data (e.g., twice encrypted data), may periodically refresh encryption of integrity check values, or may periodically refresh encryption on otherwise cleartext data (e.g., single-encrypted data). The periodically refreshed encryption of data or of integrity check values reduces the window of opportunity for an adversary to successfully perform a replay attack.

Unauthorized copies of data (such as those made by an adversary system/program) are not refreshed with subsequent new keys. When an adversary or adversary program attempts to use the unauthorized copies of data, the unauthorized copies of data are decrypted with the incorrect keys, which renders the decrypted data unintelligible.

To perform the encryption refresh operations, the replay protected systems may include first encryption circuitry, second encryption circuitry, and integrity check circuitry. The second encryption circuitry may be configured to perform the cryptographic refresh operations. The second encryption circuitry may be configured to perform the cryptographic refresh operations on data, or on integrity check values or both. The integrity check values are calculated by the integrity check circuitry and are calculated over plaintext data or cipher text data, using a domain specific integrity key. If unauthorized or unexpected changes are made to the data in memory, then the integrity check values will fail integrity checks and indicate potential corruption of the memory. In an embodiment, integrity check values constitute less than 10% of occupied memory and the second encryption circuitry performs encryption refresh operations on the integrity check values rather than on the data stored in memory, to reduce the overhead associated with encryption refresh operations. These and other embodiments are disclosed in FIGS. 1-6 and is the description below.

FIG. 1 is a block diagram of a computing environment 100 that is configured to reduce the likelihood of successful replay attacks on computing systems, in accordance with at least one embodiment described herein. In other words, the computing environment 100 employs techniques (e.g., methods and systems) that are a technological solution to a cybersecurity problem/vulnerability that exists with the operation of conventional central processing units (CPUs) and computing systems. Consequently, the present disclosure provides embodiments of specific improvements to computer functionality. The computing environment 100 includes an adversary 102 communicatively coupled to a replay protected computing system 104 through one or more networks 106 or through one or more physical connections 107 (e.g., memory interposer), according to an embodiment. FIG. 1 illustrates an example of an unsuccessful replay attack by the adversary computing system 102 against the replay protected computing system 104, according to an embodiment.

The adversary 102 may be a computing system having a program B that is a software program that may be delivered to, installed on, and/or executed by the replay protected computing system 104. When executed by the replay protected computing system 104, the program B attempts to use an unauthorized copy of (for example) a password from program A's memory space to gain access to (for example) financial data that is managed by program C. The replay protected computing system 104 protects the password and other data of program A against the replay attack by periodically refreshing the encryption keys of sections of memory with new encryption keys, so that the unauthorized copy of a password is incorrectly decrypted during the use of the unauthorized copy (e.g., a stale or un-refreshed copy) of the password by the program B. Although the replay attack example is illustrated as being performed using a program B, the adversary 102 may use a variety of techniques for copying, storing, and later overriding memory in order to perform a memory replay attack. For example, the adversary 102 may use the physical connections 107, such as memory interposes or probes, to read data from memory locations in cache or main memory and to override the memory locations with the copy of the data at a later time.

To provide protection against a replay attack, the replay protected computing system 104 includes processor cores 108, optional encryption circuitry 110, and optional integrity check circuitry 111, and memory space 112, volatile or non-volatile that is at least partially replay protected, according to an embodiment.

The processor cores 108 and the encryption circuitry 110 may include any number and/or combination of currently available and/or future developed single- or multi-core central processing units. In embodiments, the processor cores 108 and the encryption circuitry 110 may include a general-purpose processor, such as a Core® i3, i5, i7, 2 Duo and Quad, Xeon®, Itanium®, Atom®, or Quark® microprocessor, available from Intel® (Intel Corporation, SANTA CLARA, Calif.). Alternatively, the processor cores 108 and the encryption circuitry 110 may include one or more processors from another manufacturer or supplier, such as Advanced Micro Devices (AMD®, Inc.), ARM Holdings® Ltd, MIPS®, etc. The processor cores 108 and the encryption circuitry 110 may include a special-purpose processor, such as, for example, a network or communication processor, compression engine, graphics processor, co-processor, embedded processor, or the like. The processor cores 108 and the encryption circuitry 110 may be implemented as a single semiconductor package or as a combination of stacked or otherwise interconnected semiconductor packages and/or dies. The processor cores 108 and the encryption circuitry 110 may be a part of and/or may be implemented on one or more substrates using any of a number of process technologies, such as, for example, BiCMOS, CMOS, or NMOS.

The encryption circuitry 110 may be configured to encrypt and decrypt data stored in the memory space 112, to provide replay attack protection for the replay protected computing system 104. The encryption circuitry 110 may be used in conjunction with integrity check circuitry 111 to provide replay attack detection. For example, the encryption circuitry 110 may be configured to encrypt and periodically refresh the encryption of data or integrity check values, and the integrity check circuitry 111 may be configured to generate integrity check values 119 and detect corruption of data. The encryption circuitry 110 may apply an encryption algorithm 114 to data 115, in accordance with an encryption refresh policy 116, according to an embodiment. The encryption circuitry 110 is configured to receive the data 115 from the processor cores 108, encrypt the data 115, and store an encrypted version of the data 115 in the memory space 112, according to an embodiment. The encryption circuitry 110 is configured to receive the data 115 from the memory space 112, decrypt the data 115, and provide the decrypted version of the data 115 to the processor cores 108, according to an embodiment. The encryption circuitry 110 is configured to cryptographically refresh the data 115 by: reading the data 115 from the memory space 112; partially decrypting the data 115, re-encrypting the data 115, and writing the re-encrypted data 115 back to the memory space 112, either periodically or based on a number of memory accesses, to protect at least part of the memory space 112 from replay attacks, according to an embodiment.

The encryption circuitry 110 may be configured to apply one or more of a variety of encryption algorithms 114 to the data 115. The encryption algorithm 114 may include, but is not limited to, AES, RSA, triple DES, Blowfish, Twofish, and the like, according to various embodiments. The encryption algorithms 114 may be combined with the use of integrity check values 119 to detect memory corruption, in addition to preventing replay attacks. The encryption algorithm 114 may represent a first encryption algorithm and a second encryption algorithm. In one embodiment, the encryption circuitry 110 applies a first encryption algorithm to the data 115, based on a first domain, characteristic, purpose, or use for the data 115. The first domain, characteristic, purpose, or use for data 115 may include, but is not limited to: a type of program with which the data is associated; whether the data is associated with a trusted program or not; whether the data is associated with an operating system, virtual machine manager, or virtual machine; which memory addresses the data occupies; etc. According to an embodiment, the first encryption algorithm and the first domain, characteristic, purpose, or use for the data 115 is an implementation of multi-key total memory encryption (MKTME), as developed by Intel Corporation, Santa Clara, Calif. The encryption operations of the first encryption algorithm and of MKTME may comply with or be compatible with the "Intel Architecture Memory Encryption Technologies Specification", revision 1.1, dated December 2017. After applying the first encryption algorithm, the encryption circuitry 110 may be configured to apply a second encryption algorithm to the data 115, based on a second domain, characteristic, purpose, or use for the data 115. The second domain, characteristic, purpose, or use for the data 115 may include, but is not limited to, a duration of time (e.g., 500 milliseconds, or less than 10 seconds), a number of memory accesses (e.g., 5 billion accesses of the memory space 112), or a combination of a duration of time and a number of memory accesses. Thus, the encryption circuitry 110 may be configured to apply a first encryption algorithm to the data 115 for a first domain, and be configured to apply a second encryption algorithm to the data 115 for a second domain. By applying a second encryption algorithm to the data 115, and refreshing the encryption periodically (e.g., based on time and/or memory accesses), the encryption circuitry 110 may prevent or reduce the likelihood of successful replay attacks (by stale or old copies of data) of data stored in the memory space 112, according to an embodiment.

The encryption circuitry 110 may be configured to apply the encryption algorithm 114 to the data 115, in accordance with the encryption refresh policy 116. The encryption refresh policy 116 may define characteristics or criteria by which the encryption circuitry 110 encrypts and/or decrypt the data 115, to provide replay attack protection. The encryption refresh policy 116 may define the first domain of encryption, the second domain of encryption, or both the first domain of encryption and the second domain of encryption, according to an embodiment. The encryption refresh policy 116 defines the second domain of encryption to include refreshing encryption of at least part of the memory space 112 based on a duration of time elapsed (e.g., less than 1000 milliseconds, every 500 milliseconds, etc.), a number of memory accesses that have occurred, or a combination of duration of time and number of memory accesses, according to an embodiment.

Embodiments of the replay protection techniques include double encryption with different keys. The replay protection allows reduced round encryption (diffusion) with a refreshing key as it only needs to operate within a short window of time before a key refresh happens, thus giving too little time for an adversary to break it (although full-round encryption may be used as well). The refreshing key operates last on a store and first on a load, which allows patrol scrubbing along with a key refresh without having to know the per domain key.

Replay protection may work with integrity for detecting replay attempts, but even encryption alone may prevent replay of the actual data as the data will be corrupted by a replay attempt (so it still prevents replay, possibly without detecting the resulting corruption).

FIG. 1 includes an illustrative high-level example of how the encryption circuitry 110 may provide replay attack protection for the replay protected computing system 104. The adversary 102 may include a program B that is configured to read one or more unauthorized portions of the memory space 112. The adversary computing system 102 may deploy the program B onto the replay protected computing system 104 by, for example, downloading the program B into the memory space 112 in response to a user of the replay protected computing system 104 clicking an Internet hyperlink to a nefarious website.

At operation 120, the program B performs an unauthorized copy operation at a time t1 of a cryptographically refreshed password 122. The cryptographically refreshed password 122 is in a portion of the memory space 112 that is encrypted with encryption keys that are periodically refreshed by the encryption algorithm 114, in accordance with the encryption refresh policy 116 (e.g., based on a duration of time and/or based on a number of memory accesses). The encryption circuitry 110 and the encryption algorithm 114 provide temporal protections to the cryptographically refreshed password 122 so that copies of the password and other data in the memory space 112 may be correctly decrypted by the encryption circuitry 110 for short durations of time, until cryptographic refreshes change the encryption keys.

The unauthorized copy may result in the copy of the password at time t1 126. The adversary 102 may store an encrypted copy of the password at time t1 126 in a number of locations. The encrypted copy of the password at time t1 126 may be stored in cache, in main memory, to one or more external memory locations, and the like.

At operation 123, the adversary 102 (e.g., using program B) performs a memory override at time t2. The memory override copies the encrypted copy of password at t1 126 over the memory location that was occupied by the cryptographically refreshed password 122. Time t2 is some amount of time after the time t1. The time t1 is when the cryptographically refreshed password 122 was copied.

At operation 124, the memory override results in a replay attack attempt. The replay attack is an attempt to apply the copy of password at time t1 126 to an authentication routine 128 of a program C, to obtain access to financial data 130. The authentication routine 128 occupies a portion of the memory space 112 that is associated with or assigned to the program C. Because the encrypted copy of password at time t1 126 is copied and not refreshed by the encryption algorithm 114, an attempt by the program B or the program C to use the copy of password at time t1 126 will result in an unrecognizable representation of the cryptographically refreshed password 122.

At operation 132, the program C denies access to the financial data 130 for the program B.

In this simplified example of a failed replay attack, a password is used as an example of data that may be copied and used to override memory locations to perform a replay attack. While the example of password data is one example of data used for a replay attack, many other types of data may be used. Additional examples of data that may be used for a replay attack include, but are not limited to, a single bit of data for checking for malware, system authentication data, web-based authentication data, data representing a dollar amount, a geolocation, PII, healthcare information, currency, business transactions, communications messages, control protocols, and the like. Additionally, as described above, the adversary 102 may be a computing system coupled to the replay protected computing system 104 through one or more networks 106, and/or the adversary 102 may be a person using one or more physical connections 107 to copy and override data in memory to perform the replay attack.

Figure 2A:
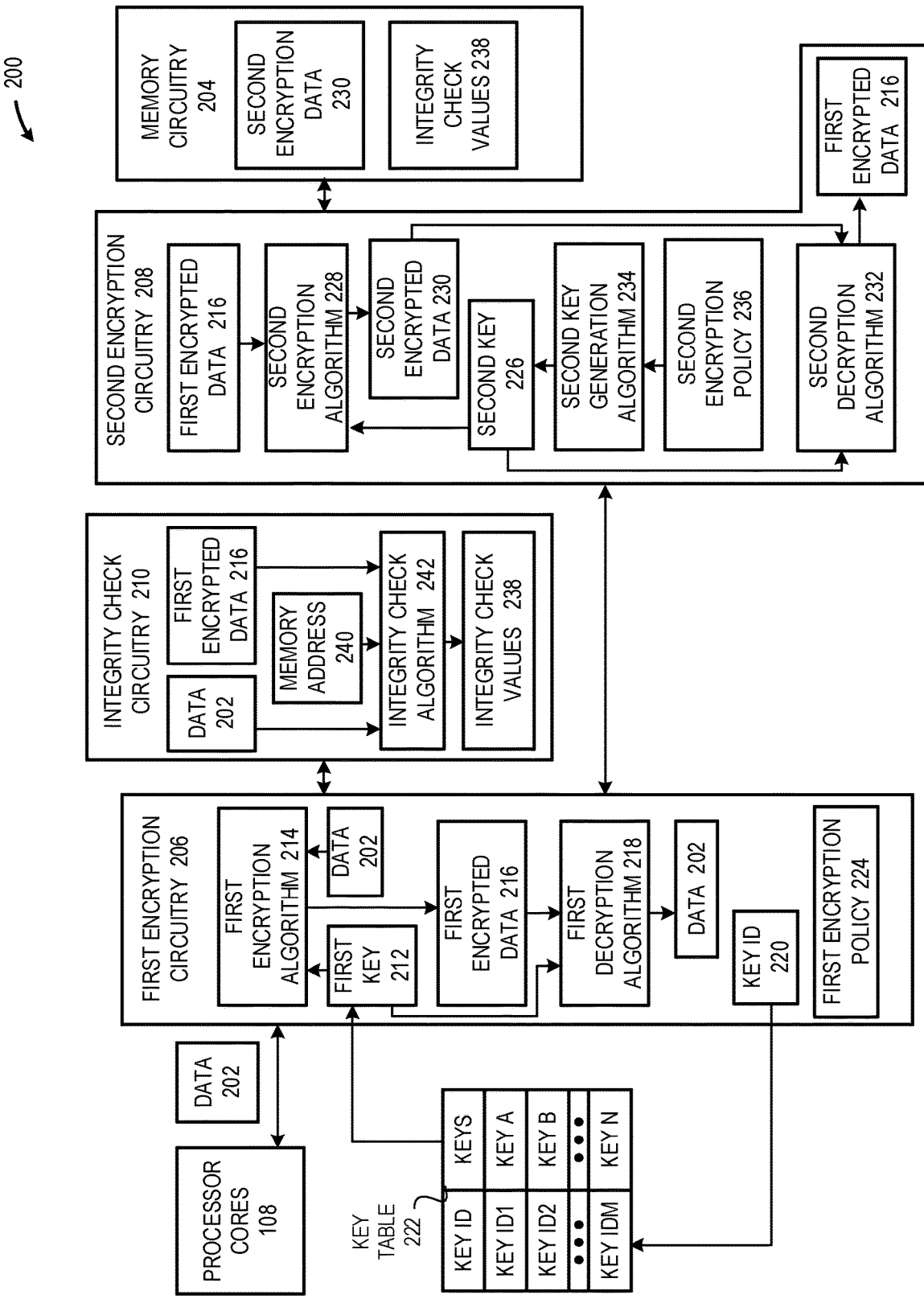
FIG. 2A is a block diagram of a system for protecting against replay attacks, in accordance with at least one embodiment described herein.
Figure 2B:
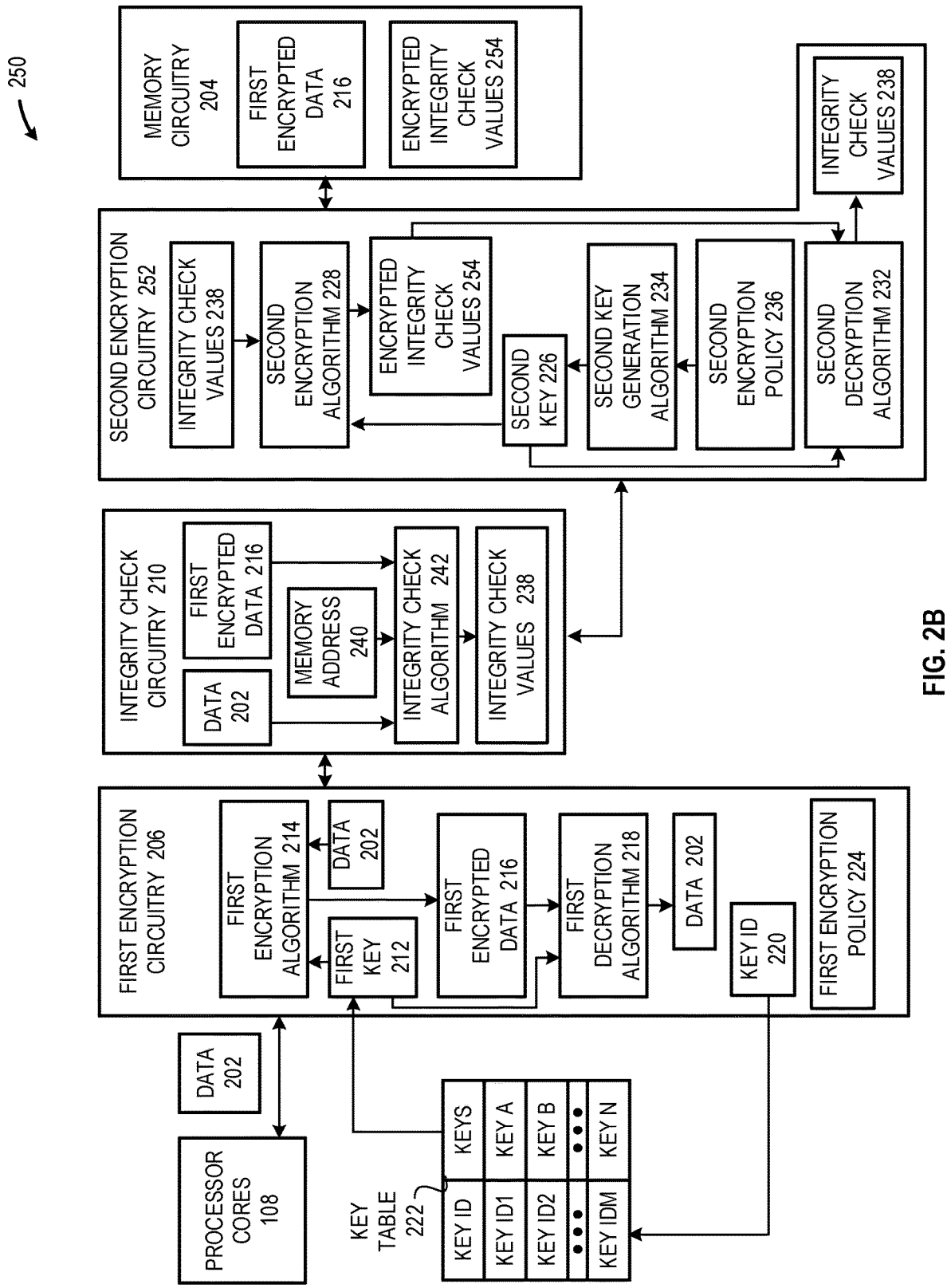
FIG. 2B is a block diagram of a system for protecting against replay attacks, in accordance with at least one embodiment described herein.

FIGS. 2A and 2B illustrate additional example embodiments of replay protected computing systems, consistent with embodiments of the present disclosure.

FIG. 2A illustrates an example embodiment of a replay protected computing system 200, consistent with embodiments of the present disclosure. The replay protected computing system 200 may protect data 202 by encrypting and decrypting the data 202 between the processor cores 108 and memory circuitry 204. The replay protected computing system 200 is an example implementation of the replay protected computing system 104 (shown in FIG. 1), according to an embodiment. The replay protected computing system 200 may prevent or reduce the likelihood of a replay attack on the memory circuitry 204 by encrypting the data 202 with a first encryption algorithm according to a first encryption policy, and by encrypting the data 202 with a second encryption algorithm according to a second encryption policy, according to an embodiment. To protect the data 202 against a replay attack, the replay protected computing system 200 includes first encryption circuitry 206, second encryption circuitry 208, and integrity check circuitry 210, according to an embodiment.

The replay protected computing system 200 may use the first encryption circuitry 206 to encrypt the data 202 in accordance with a first encryption policy. The first encryption circuitry 206 may apply the data 202 and a first key 212 to a first encryption algorithm 214 to generate first encrypted data 216, according to an embodiment. The first encryption circuitry 206 may apply the first encrypted data 216 and the first key 212 to a first decryption algorithm 218, to reverse the encryption process and restore the data 202, according to an embodiment. The first encryption algorithm 214 and the first decryption algorithm 218 may be the same encryption algorithm. The first encryption algorithm 214 and the first decryption algorithm 218 may include, but are not limited to, AES, AES-XTS, RSA, triple DES, Blowfish, Twofish, and the like, according to various embodiments.

The first encryption circuitry 206 may use a key ID 220 and a key table 222 to identify the first key 212, according to an embodiment. The key ID 220 may be identified, by the first encryption circuitry 206, by analyzing a memory address for the data 202. In particular, the key ID 220 may be represented by one or more bits of a memory address for the data 202. In one embodiment, the key ID 220 may be defined by one or more most significant bits (e.g., the 3 most significant bits) of the memory address for the data 202. In another embodiment, the key ID 220 may be associated with the data 202 in some out-of-band manner. The first encryption circuitry 206 may apply the key ID 220 to the key table 222 to identify the first key 212 (or to identify any key that is to be used to encrypt the data 202), according to an embodiment. The key table 222 includes a number of key IDs (e.g., key ID1, key ID2, . . . key IDm) that are each associated with a corresponding encryption key (e.g., key A, key B, . . . key n), according to an embodiment. The key IDs may be reassigned to different keys or different keys may be assigned to specific key IDs.

The first encryption circuitry 206 may select the first key 212 using one or more techniques (other than the key ID 220 and the key table 222), according to definitions included in a first encryption policy 224, according to an embodiment. The first encryption policy 224 may include a first domain, characteristic, purpose, or use for the data 202, which may include, but is not limited to: a type of program with which the data is associated; whether the data is associated with a trusted program or not; whether the data is associated with an operating system, virtual machine manager, a virtual machine, or not; and which memory addresses the data occupies. In other words, if the data 202 is associated with an operating system, the data 202 may be encrypted with key A, but if the data 202 is associated with a non-management programs, the data may be encrypted with a key B, as a simplified example of a potential first domain.

According to an embodiment, the first encryption circuitry 206 may include an implementation of multi-key total memory encryption (MKTME), as developed by Intel Corporation, Santa Clara, Calif. The first encryption circuitry 206 may comply with or be compatible with the "Intel Architecture Memory Encryption Technologies Specification", revision 1.1, dated December 2017.

The replay protected computing system 200 may use the second encryption circuitry 208 to encrypt the data 202 a second time, by encrypting the first encrypted data 216, in accordance with a second encryption policy. The replay protected computing system 200 may prevent or may reduce the likelihood of a replay attack on the memory circuitry 204 by encrypting the data 202 with the first encryption algorithm 214 according to a first encryption policy 224, and by encrypting the first encrypted data 216 with a second encryption algorithm 228, according to an embodiment.

The second encryption circuitry 208 may apply the first encrypted data 216 and a second key 226 to a second encryption algorithm 228 to generate second encrypted data 230, according to an embodiment. The second encryption circuitry 208 may apply the second encrypted data 230 and the second key 226 to a second decryption algorithm 232 to recover the first encrypted data 216. The second encryption algorithm 228 and the second decryption algorithm 232 may be the same encryption algorithm. The second encryption algorithm 228 and the second decryption algorithm 232 may include, but are not limited to, AES, AES-XTS, RSA, triple DES, Blowfish, Twofish, and the like, according to various embodiments.

The second encryption circuitry 208 may include and use a second key generation algorithm 234 to generate and/or determine the second key 226. The second key generation algorithm 234 may be a pseudo-random key generator that may be based on one or more hardware, software, or otherwise internal encryption seeds (e.g., seconds of time), according to an embodiment.

The second encryption circuitry 208 may selectively generate the second key 226 using the second key generation algorithm 234 based on a second encryption policy 236, according to an embodiment. The second encryption policy 236 may be an implementation of the encryption refresh policy 116 (shown in FIG. 1). The second encryption policy 236 protects the data 202 and the first encrypted data 216 from a replay attack by changing the second key 226 according to a limited amount of time or according to a predetermined number of memory accesses of the memory circuitry 204, according to an embodiment. Although the first encryption algorithm 214 may protect the data 202 from being decrypted into plaintext, a replay attack may utilize the first encrypted data 216, in its encrypted form, to obtain access to programs or data (e.g., the financial data 130 of program C). By changing the value of the second key 226 rapidly (e.g., every 500 milliseconds, every 1000 memory accesses) a twice-encrypted copy of data in the memory circuitry 204 will be decrypted with the wrong version of the second key 226 if an adversary attempts to use a stale (e.g., non-refreshed) version of data.

The second encrypted data 230 is stored in the memory circuitry 204, according to an embodiment. The second encrypted data 230 may be written to the memory circuitry 204 by the second encryption circuitry 208, according to an embodiment. The second encryption circuitry 208 may be included within a memory controller circuitry of one or more memory controllers of the replay protected computing system 200, according to one implementation. The memory circuitry 204 may also store integrity check values 238, which may be used to verify that the second encryption data 230 has not been tampered with or otherwise changed.

To identify when information stored in the memory circuitry 204 has been corrupted or has otherwise received an unauthorized change, the replay protected computing system 200 uses the integrity check circuitry 210 to generate and validate the integrity check values 238, using a separate integrity key, according to an embodiment. The integrity check circuitry 210 includes an integrity check algorithm 242 that generates the integrity check values 238, according to an embodiment. The integrity check circuitry 210 may provide the data 202, the first encrypted data 216, and a memory address 240 for the data 202, to the integrity check algorithm 242 to generate the integrity check values 238.

FIG. 2B illustrates an example of a replay protected computing system 250 that is configured to apply a second encryption algorithm to integrity check values to prevent or to reduce the likelihood of a successful replay attack by an adversary, consistent with embodiments of the present disclosure.

The replay protected computing system 250 includes second encryption circuitry 252 that is configured to generate encrypted integrity check values 254, to be stored in the memory circuitry 204 with the first encrypted data 216, according to an embodiment. Second encryption circuitry 252 applies the integrity check values 238 and the second key 226 to the second encryption algorithm 228, to generate the encrypted integrity check values 254. An advantage of encrypting the integrity check values 238 is that fewer quantities of information would need to the encrypted by the second encryption circuitry 252, while still providing the advantages disclosed against replay attacks.

Figure 3:
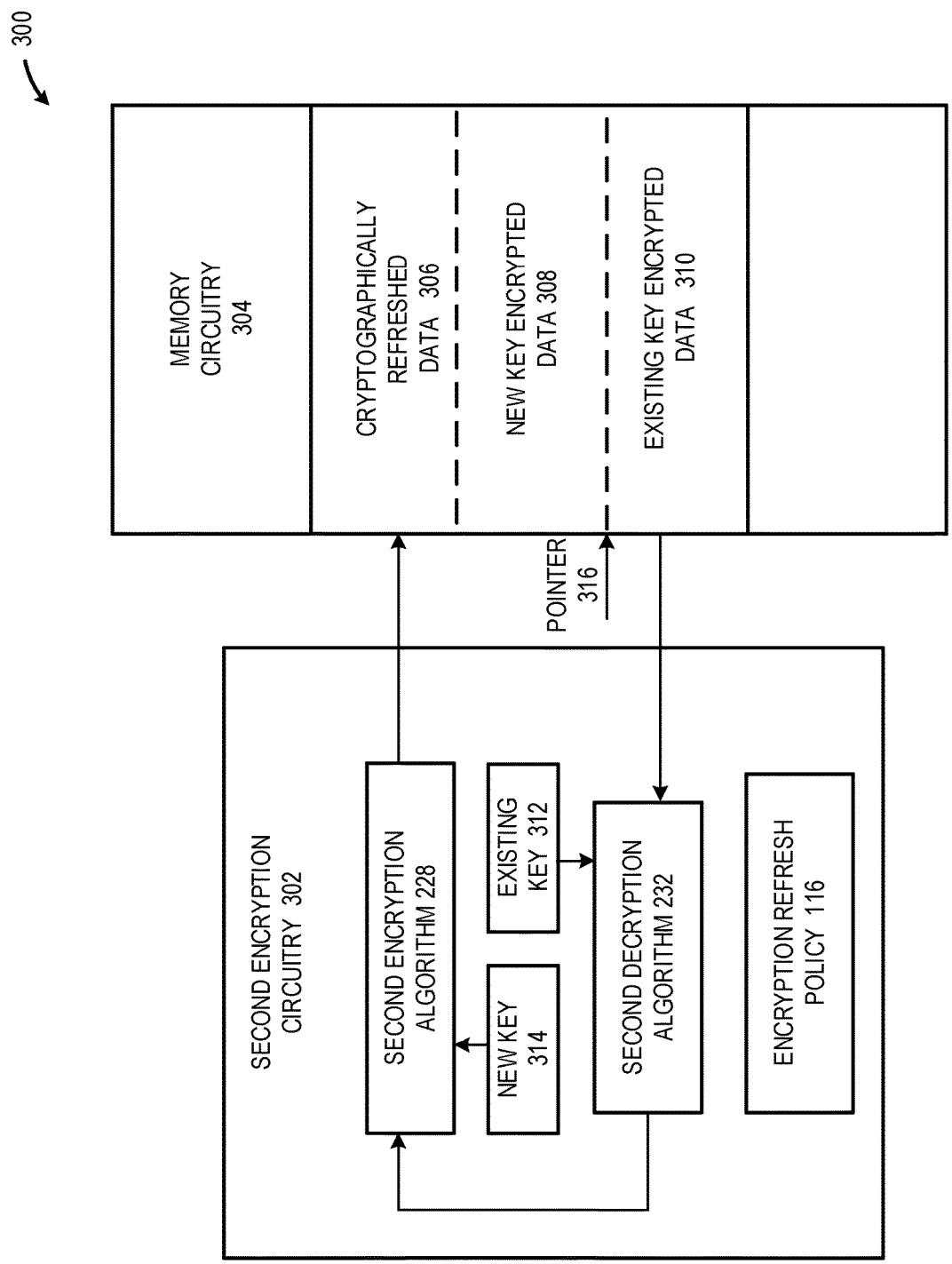
FIG. 3 is a block diagram of an encryption refresh system for updating an encryption key, in accordance with at least one embodiment described herein.

FIG. 3 illustrates an encryption refresh system 300 for updating an encryption key within quantities of time or operations that would make it difficult or highly unlikely for a replay attack to be successful, consistent with embodiments of the disclosure. The encryption refresh system 300 may include second encryption circuitry 302 that is configured to refresh or update the encryption of the data stored in the memory circuitry 304, to prevent or reduce the likelihood of successful replay attacks.

The memory circuitry 304 stores cryptographically refreshed data 306, according to an embodiment. The cryptographically refreshed data 306 may include new key encrypted data 308 and existing key encrypted data 310. The new key encrypted data 308 represents data that has been updated or refreshed with an updated or new encryption key, and the existing key encrypted data 310 represents data that has been previously encrypted, for example, prior to the expiration of criteria defined by the encryption refresh policy 116, according to an embodiment.

The second encryption circuitry 302 may include the second encryption algorithm 228, the second decryption algorithm 232, an existing key 312, and a new key 314. The second encryption circuitry 302 may be an implementation of the second encryption circuitry 208 or 252. The second encryption circuitry 302 may decrypt the existing key encrypted data 310 using the existing key 312 and the second decryption algorithm 232. After decrypting the existing key encrypted data 310, the second encryption circuitry 302 may re-encrypt the decrypted data using the second encryption algorithm 228 with the new key 314. The second encryption circuitry 302 may track the re-encryption operations using a pointer 316 that identifies memory locations in the memory circuitry 304 that have been re-encrypted and that have not been re-encrypted. The encryption refresh operations may be accomplished in accordance with the encryption refresh policy 116, to prevent or reduce the likelihood of successful replay attacks on information stored by the memory circuitry 304, consistent with embodiments of the disclosure.

Figure 4:
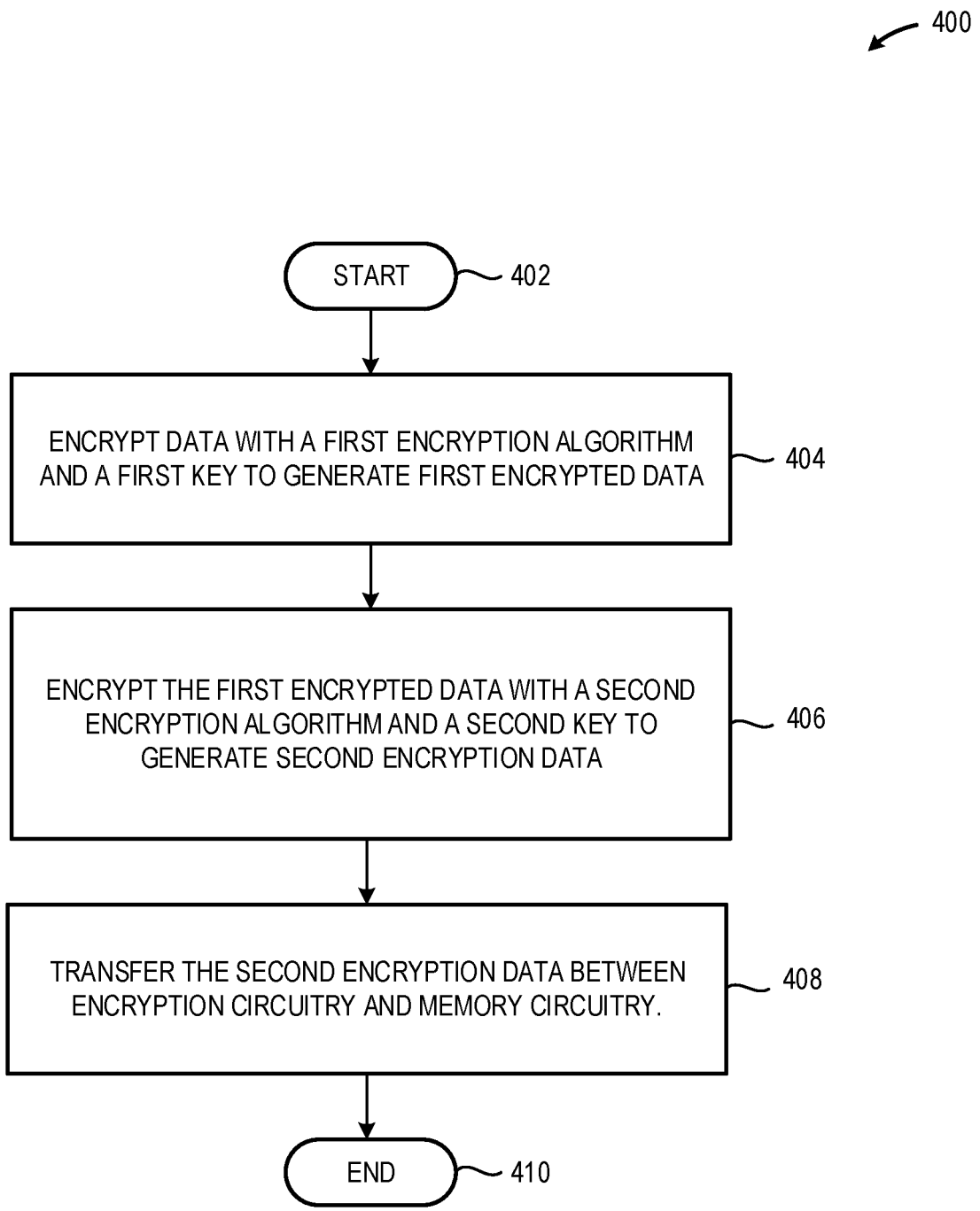
FIG. 4 is a flow diagram of an illustrative method of protecting data from replay attacks, in accordance with at least one embodiment described herein.

FIG. 4 illustrates a method 400 of protecting data from replay attacks, consistent with embodiments of the present disclosure.

At operation 402, the method 400 begins.

At operation 404, the method 400 may encrypt data with a first encryption algorithm and a first key to generate first encrypted data.

At operation 406, the method 400 may encrypt the first encrypted data with a second encryption algorithm and a second key to generate second encryption data.

At operation 408, the method 400 may transfer the second encryption data between encryption circuitry and memory circuitry.

At operation 410, the method 400 ends.

Figure 5:
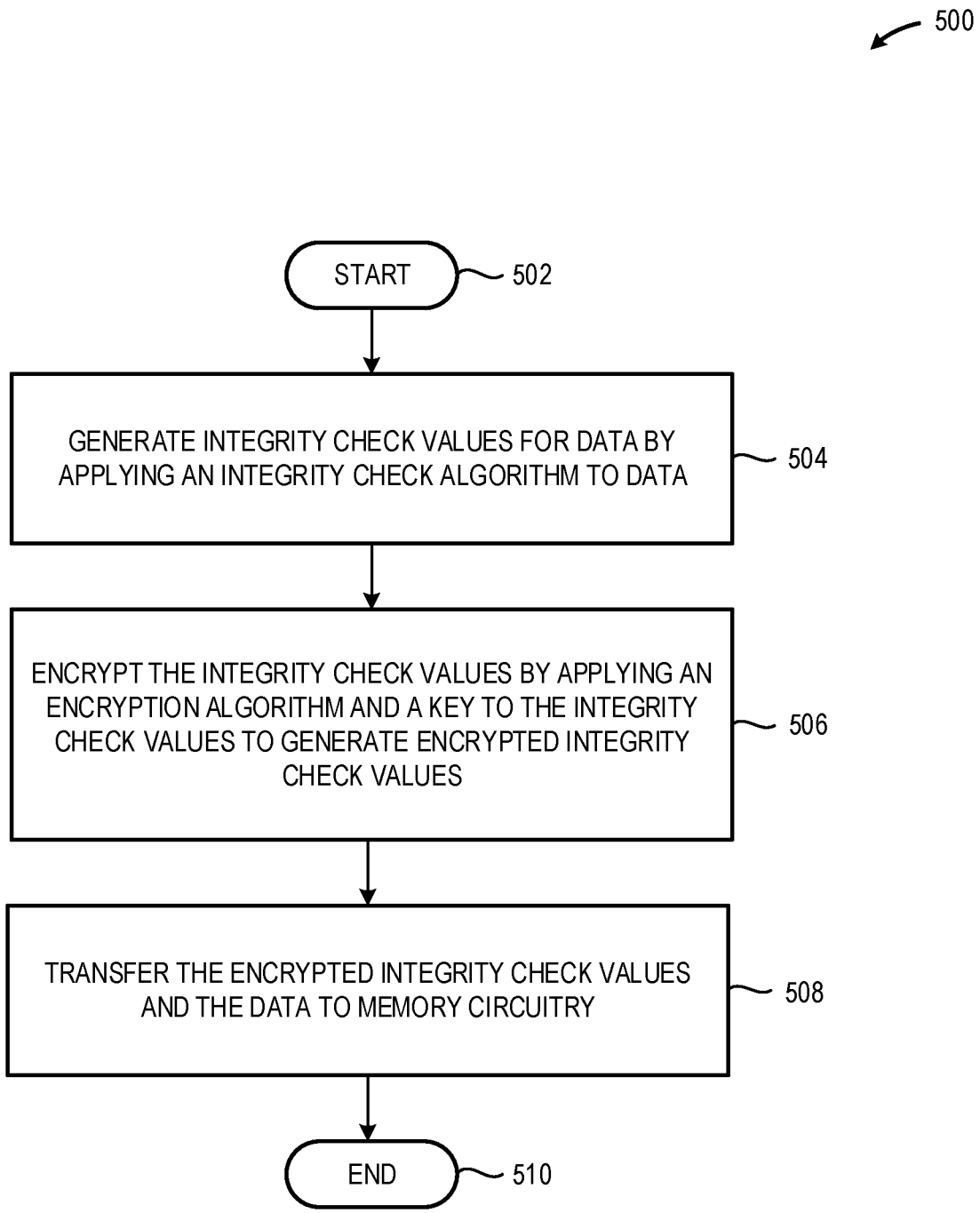
FIG. 5 is a flow diagram of an illustrative method of protecting data from replay attacks, in accordance with at least one embodiment described herein.

FIG. 5 illustrates a method 500 of protecting data from replay attacks, consistent with embodiments of the present disclosure.

At operation 502, the method 500 begins.

At operation 504, the method 500 may generate integrity check values for data by applying an integrity check algorithm to the data.

At operation 504, the integrity check values may optionally be generated over the previously encrypted data using the first encryption key.

At operation 506, the method 500 may encrypt the integrity check values by applying an encryption algorithm and a second encryption key to the integrity check values to generate encrypted integrity check values.

At operation 508, the method 500 may transfer the encrypted integrity check values and the data to memory circuitry.

At operation 510, the method 500 ends.

Figure 6:
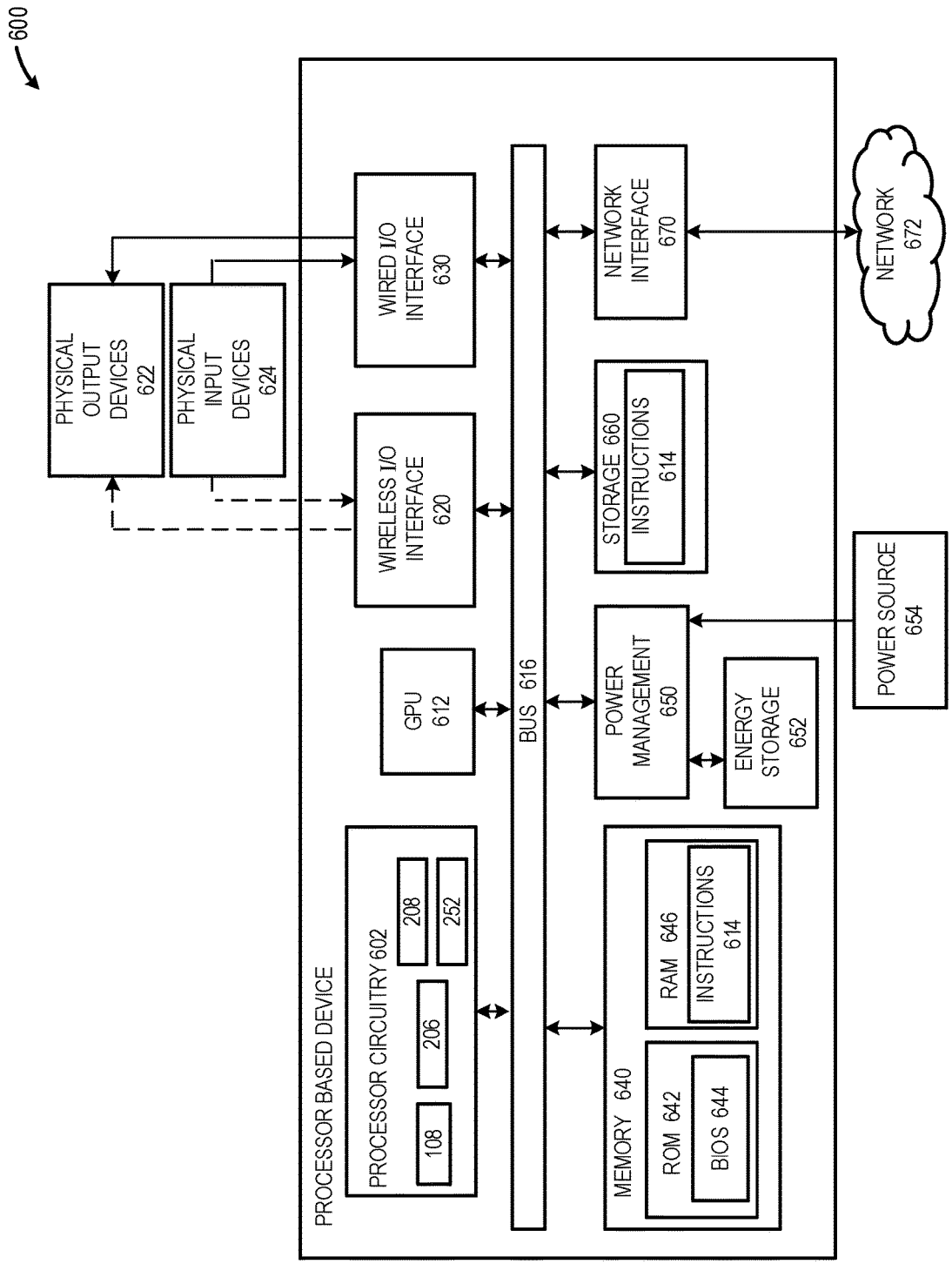
FIG. 6 is a schematic diagram of an illustrative electronic, processor-based, device that includes processor circuitry that includes encryption circuitry for protecting against replay attacks, in accordance with at least one embodiment described herein Although the following Detailed Description will proceed with reference being made to illustrative embodiments, many alternatives, modifications and variations thereof will be apparent to those skilled in the art.

FIG. 6 is a schematic diagram of an illustrative electronic, processor-based, device 600 that includes processor circuitry 602 having encryption circuitry for protecting against replay attacks, in accordance with at least one embodiment described herein. The processor-based device 600 may additionally include one or more of the following: a graphical processing unit 612, a wireless input/output (I/O) interface 620, a wired I/O interface 630, memory circuitry 640, power management circuitry 650, non-transitory storage device 660, and a network interface 670. The following discussion provides a brief, general description of the components forming the illustrative processor-based device 600. Example, non-limiting processor-based devices 600 may include: smartphones, wearable computers, portable computing devices, handheld computing devices, desktop computing devices, blade server devices, workstations, and similar.

The processor-based device 600 includes processor circuitry 602 that includes the processor cores 109, first encryption circuitry 206, and second encryption circuitry 208 and/or 252, according to an embodiment. In embodiments, the processor-based device 600 may additionally include graphics processor circuitry 612. In embodiments, the processor-based device 600 includes processor circuitry 602 capable of executing machine-readable instruction sets 614, reading data and/or instruction sets 614 from one or more storage devices 660 and writing data to the one or more storage devices 660. In some embodiments, the processor-based device 600 includes graphics processor circuitry 612 capable of executing machine-readable instruction sets 614 and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor circuitry 602 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The processor-based device 600 includes a bus or similar communications link 616 that communicably couples and facilitates the exchange of information and/or data between various system components including the processor circuitry 602, the graphics processor circuitry 612, one or more wireless I/O interfaces 620, one or more wired I/O interfaces 630, one or more storage devices 660, and/or one or more network interfaces 670. The processor-based device 600 may be referred to in the singular herein, but this is not intended to limit the embodiments to a single processor-based device 600, since in certain embodiments, there may be more than one processor-based device 600 that incorporates, includes, or contains any number of communicably coupled, collocated, or remote networked circuits or devices.

The processor circuitry 602 may include any number, type, or combination of currently available or future developed devices capable of executing machine-readable instruction sets. The processor circuitry 602 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The bus 616 that interconnects at least some of the components of the processor-based device 600 may employ any currently available or future developed serial or parallel bus structures or architectures.

The system memory 640 may include read-only memory ("ROM") 642 and random access memory ("RAM") 646. A portion of the ROM 642 may be used to store or otherwise retain a basic input/output system ("BIOS") 644. The BIOS 644 provides basic functionality to the processor-based device 600, for example by causing the processor circuitry 602 to load and/or execute one or more machine-readable instruction sets 614. In embodiments, at least some of the one or more machine-readable instruction sets 614 cause at least a portion of the processor circuitry 602 to provide, create, produce, transition, and/or function as a dedicated, specific, and particular machine, for example a word processing machine, a digital image acquisition machine, a media playing machine, a gaming system, a communications device, a smartphone, or similar.

The processor-based device 600 may include at least one wireless input/output (I/O) interface 620. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The processor-based device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include, but are not limited to: universal serial bus (USB), IEEE 1394 ("FireWire"), and similar.

The processor-based device 600 may include one or more communicably coupled, non-transitory, data storage devices 660. The data storage devices 660 may include one or more hard disk drives (HDDs) and/or one or more solid-state storage devices (SSDs). The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 660 may include one or more removable storage devices, such as one or more flash drives, flash memories, flash storage units, or similar appliances or devices capable of communicable coupling to and decoupling from the processor-based device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor circuitry 602 and/or graphics processor circuitry 612 and/or one or more applications executed on or by the processor circuitry 602 and/or graphics processor circuitry 612. In some instances, one or more data storage devices 660 may be communicably coupled to the processor circuitry 602, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or WiFi®, etc.).

Processor-readable instruction sets 614 and other programs, applications, logic sets, and/or modules may be stored in whole or in part in the system memory 640. Such instruction sets 614 may be transferred, in whole or in part, from the one or more data storage devices 660. The instruction sets 614 may be loaded, stored, or otherwise retained in system memory 640, in whole or in part, during execution by the processor circuitry 602 and/or graphics processor circuitry 612. The processor-readable instruction sets 614 may include machine-readable and/or processor-readable code, instructions, or similar logic capable of providing the speech coaching functions and capabilities described herein.

The processor-based device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the processor-based device 600. The power source 654 may include, but is not limited to, a solar power system, a commercial electric grid, a portable generator, an external energy storage device, or any combination thereof.

For convenience, the processor circuitry 602, the graphics processor circuitry 612, the wireless I/O interface 620, the wired I/O interface 630, the power management circuitry 650, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor circuitry 602 and/or the graphics processor circuitry 612. In some embodiments, all or a portion of the bus 616 may be omitted and the components are coupled directly to each other using suitable wired or wireless connections.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, non-volatile memory, or any type of media suitable for storing electronic instructions. Other embodiments may be implemented as software executed by a programmable control device.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for forming magnetically lined through-holes in a semiconductor package substrate.

EXAMPLES

Examples of the present disclosure include subject material such as a method, a device, an apparatus, or a system related to protecting computing systems against memory replay attacks, as discussed below.

Example 1

According to this example, there is provided an apparatus. The apparatus includes first encryption circuitry to encrypt data with a first encryption algorithm and a first key to generate first encrypted data, wherein the first encryption circuitry to encrypt the data based on a first domain; second encryption circuitry coupled to the first encryption circuitry, the second encryption circuitry to encrypt the first encrypted data with a second encryption algorithm and a second key to generate second encryption data, wherein the second encryption circuitry to encrypt the first encrypted data based on a second domain to limit a time window for a replay attack; and memory controller circuitry coupled to the second encryption circuitry to transfer the second encryption data between the second encryption circuitry and memory circuitry.

Example 2

This example includes the elements of example 1, wherein the first domain includes one or more of individual computer programs, computer program characteristics, memory address groups, or levels of privilege, wherein the second domain includes time, memory accesses of the memory circuitry, or a combination of the time and the memory accesses of the memory circuitry.

Example 3

This example includes the elements of example 2, wherein the second encryption circuitry to refresh the second key based on an expiration of a predetermined duration of the time or based on a predetermined number of the memory accesses of the memory circuitry.

Example 4

This example includes the elements of example 3, wherein to refresh the second key, the second encryption circuitry is configured to decrypt the second encryption data to the first encryption data with the second key, the second encryption circuitry is configured to encrypt the first encryption data with a third encryption key, and the second encryption circuitry is configured to redefine the third encryption key as the second key.

Example 5

This example includes the elements of example 1, wherein the first domain is at least partially determined by a first encryption policy that defines which of a plurality of encryption keys to apply to the data at least partially based on characteristics of the data.

Example 6

This example includes the elements of example 1, wherein the first key is one of a plurality of first keys that is selected by the first encryption circuitry at least partially based on a key identifier, wherein the key identifier is defined by a portion of a memory address for the data.

Example 7

This example includes the elements of example 1, wherein the second encryption circuitry is fabricated within the memory controller circuitry.

Example 8

According to this example, there is provided a method. The method includes encrypting, with first encryption circuitry, data with a first encryption algorithm and a first key to generate first encrypted data, wherein selection of the first key is at least partially based on a first encryption policy; encrypting, with second encryption circuitry, the first encrypted data with a second encryption algorithm and a second key to generate second encryption data, wherein selection of the second key is at least partially based on a second encryption policy, to limit a time window for a replay attack; and transferring the second encryption data between the second encryption circuitry and memory circuitry.

Example 9

This example includes the elements of example 8, wherein the first encryption policy selects the first key based on one or more of individual computer programs, computer program characteristics, memory address groups, or levels of privilege, wherein the second encryption policy refreshes the second key based on time, memory accesses of the memory circuitry, memory address ranges, or a combination of the time and the memory accesses of the memory circuitry.

Example 10

This example includes the elements of example 8, further comprising: decrypting the second encryption data to the first encryption data with the second key; encrypting the first encryption data with a third encryption key; and redefining the third encryption key as the second key.

Example 11

This example includes the elements of example 8, wherein the first key is one of a plurality of first keys that is selected by the first encryption circuitry at least partially based on a key identifier, wherein the key identifier is defined by a portion of a memory address for the data.

Example 12

According to this example, there is provided an apparatus. The apparatus includes integrity check circuitry to apply an integrity check algorithm to data, where the data may be plaintext data or cipher text resulting from the output of applying the first encryption circuitry, to generate integrity check values for the data, based on an integrity check key; encryption circuitry coupled to the integrity check circuitry, the encryption circuitry to encrypt the integrity check values with an encryption algorithm and a key to generate encrypted integrity check values, the encryption circuitry to refresh the key based on, a duration of time, a memory access count, or the duration of time and the memory access count; and memory controller circuitry to transfer, between the encryption circuitry and memory circuitry, the encrypted integrity check values and the data.

Example 13

This example includes the elements of example 12, wherein the encryption circuitry is first encryption and integrity circuitry, wherein the apparatus further comprises: second encryption circuitry coupled between processor circuitry and the first encryption and integrity circuitry, the second encryption circuitry to encrypt the data at least partially based on a domain.

Example 14

This example includes the elements of example 13, wherein the domain includes one or more of individual computer programs, computer program characteristics, memory address groups, or levels of privilege.

Example 15

This example includes the elements of example 12, wherein the duration of time is less than 10 seconds or duration of time is based on exhausting the second encryption key.

Example 16

This example includes the elements of example 12, wherein the duration of time is based on using the second encryption key for a time period which is less than or equal to that recommended for the cryptographic algorithm being used based on sound cryptographic principles.

Example 17

This example includes the elements of example 12, wherein the encryption circuitry is included within the memory controller circuitry.

Example 18

This example includes the elements of example 12, wherein the memory controller circuitry associates the integrity check values with the data in the memory circuitry.

Example 19

This example includes the elements of example 12, wherein the memory access count is based on a number of memory accesses of a specific range of memory addresses.

Example 20

This example includes the elements of example 12, wherein the memory access count is in the range of 1 billion to 10 billion memory accesses.

Example 21

This example includes the elements of example 12, read the encrypted integrity check values; generate a new key; decrypt the encrypted integrity check values with the key; encrypt the integrity check values with a new key; and write the encrypted integrity check values to memory.

Example 22

According to this example, there is provided a computer readable device storing instructions that, if executed by one or more processors, performs the method of any one of examples 8 to 11.

Example 23

According to this example, there is provided a device comprising means to perform the method of any one of examples 8 to 11.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. An apparatus, comprising:
   first encryption circuitry to encrypt data with a first encryption algorithm and a first key to generate first encrypted data, wherein the first encryption circuitry to encrypt the data based on a first domain that includes one or more of individual computer programs, computer program characteristics, memory address groups, or levels of privilege, wherein a second domain includes time, memory accesses of memory circuitry, or a combination of the time and the memory accesses of the memory circuitry;
   second encryption circuitry coupled to the first encryption circuitry, the second encryption circuitry to:
   encrypt the first encrypted data with a second encryption algorithm and a second key to generate second encryption data, wherein the second encryption circuitry to encrypt the first encrypted data based on the second domain to limit a time window for a replay attack; and
   refresh the second key based on an expiration of a predetermined duration of the time or based on a predetermined number of the memory accesses of the memory circuitry;
   wherein to refresh the second key, the second encryption circuitry is configured to decrypt the second encryption data to the first encryption data with the second key, the second encryption circuitry is configured to encrypt the first encryption data with a third encryption key, and the second encryption circuitry is configured to redefine the third encryption key as the second key; and
   memory controller circuitry coupled to the second encryption circuitry to transfer the second encryption data between the second encryption circuitry and the memory circuitry.

2. The apparatus of claim 1, wherein the first domain is at least partially determined by a first encryption policy that defines which of a plurality of encryption keys to apply to the data at least partially based on characteristics of the data.

3. The apparatus of claim 1, wherein the first key is one of a plurality of first keys that is selected by the first encryption circuitry at least partially based on a key identifier, wherein the key identifier is defined by a portion of a memory address for the data.

4. The apparatus of claim 1, wherein the second encryption circuitry is fabricated within the memory controller circuitry or within the memory circuitry.

5. A computer-readable device having instructions that, when executed by at least one processor, cause the at least one processor to perform operations, comprising:
   encrypt, with first encryption circuitry, data with a first encryption algorithm and a first key to generate first encrypted data, wherein selection of the first key is at least partially based on a first encryption policy that selects the first key based on one or more of individual computer programs, computer program characteristics, memory address groups, or levels of privilege, wherein a second encryption policy refreshes a second key based on time, memory accesses of memory circuitry, or a combination of the time and the memory accesses of the memory circuitry;
   encrypt, with second encryption circuitry, the first encrypted data with a second encryption algorithm and the second key to generate second encryption data, wherein selection of the second key is at least partially based on the second encryption policy, to limit a time window for a replay attack;
   transfer the second encryption data between the second encryption circuitry and the memory circuitry;
   decrypt the second encryption data to the first encryption data with the second key;
   encrypt the first encryption data with a third encryption key; and
   redefine the third encryption key as the second key.

6. The computer-readable device of claim 5, wherein the first key is one of a plurality of first keys that is selected by the first encryption circuitry at least partially based on a key identifier, wherein the key identifier is defined by a portion of a memory address for the data.

7. An apparatus, comprising:
   integrity check circuitry to apply an integrity check algorithm to data to generate integrity check values for the data, based on a first integrity key;
   encryption circuitry coupled to the integrity check circuitry, the encryption circuitry to encrypt the integrity check values with an encryption algorithm and a key to generate encrypted integrity check values, the encryption circuitry to refresh the key based on, a duration of time, a memory access count, or the duration of time and the memory access count;

wherein the encryption circuitry includes:

first encryption circuitry to encrypt the data with a first encryption algorithm and a first key to generate first encrypted data, wherein selection of the first key is at least partially based on a first encryption policy that selects the first key based on one or more of individual computer programs, computer program characteristics, memory address groups, or levels of privilege, wherein a second encryption policy refreshes a second key based on time, memory accesses of memory circuitry;

second encryption circuitry to encrypt the first encrypted data with a second encryption algorithm and the second key to generate second encryption data, wherein selection of the second key is at least partially based on the second encryption policy, to limit a time window for a replay attack; and wherein the encryption circuitry to further:

decrypt the second encryption data to the first encryption data with the second key;

encrypt the first encryption data with a third encryption key; and redefine the third encryption key as the second key; and memory controller circuitry to transfer, between the encryption circuitry and the memory circuitry, the encrypted integrity check values and the data.

8. The apparatus of claim 7, wherein the domain includes one or more of individual computer programs, computer program characteristics, memory address groups, or levels of privilege.

9. The apparatus of claim 7, wherein the duration of time is less than 10 seconds.

10. The apparatus of claim 7, wherein the encryption circuitry is included within the memory controller circuitry or memory circuitry.

11. The apparatus of claim 7, wherein the memory controller circuitry associates the integrity check values with the data in the memory circuitry.

12. The apparatus of claim 7, wherein the memory access count is based on a number of memory accesses of a specific range of memory addresses.

13. The apparatus of claim 7, wherein the memory access count is in the range of 1 billion to 10 billion memory accesses.

14. The apparatus of claim 7, wherein the encryption circuitry to refresh the key, includes:

generate a new key;

read the encrypted integrity check values;

decrypt the encrypted integrity check values with the old key;

encrypt the integrity check values with a new key; and write the encrypted integrity check values to memory.

* * * * *